Sept. 6, 1949.　　　C. D. HIRST ET AL　　　2,480,925
PROPORTIONING VALVE
Filed Sept. 18, 1945　　　2 Sheets-Sheet 2
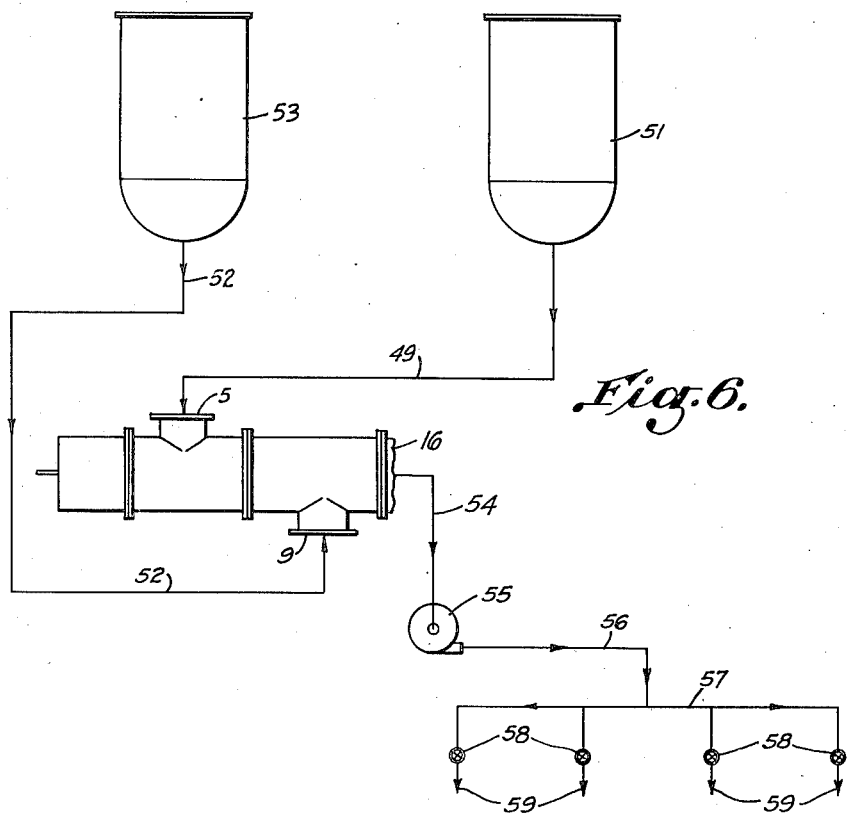
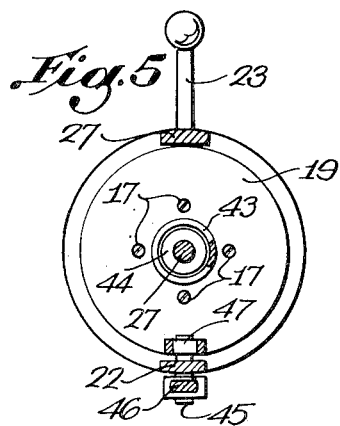
INVENTORS
GEORGE L. WOODINGTON
CHARLES D. HIRST
BY Mellin, Aurich and Hanscom
ATTORNEYS Patented Sept. 6, 1949

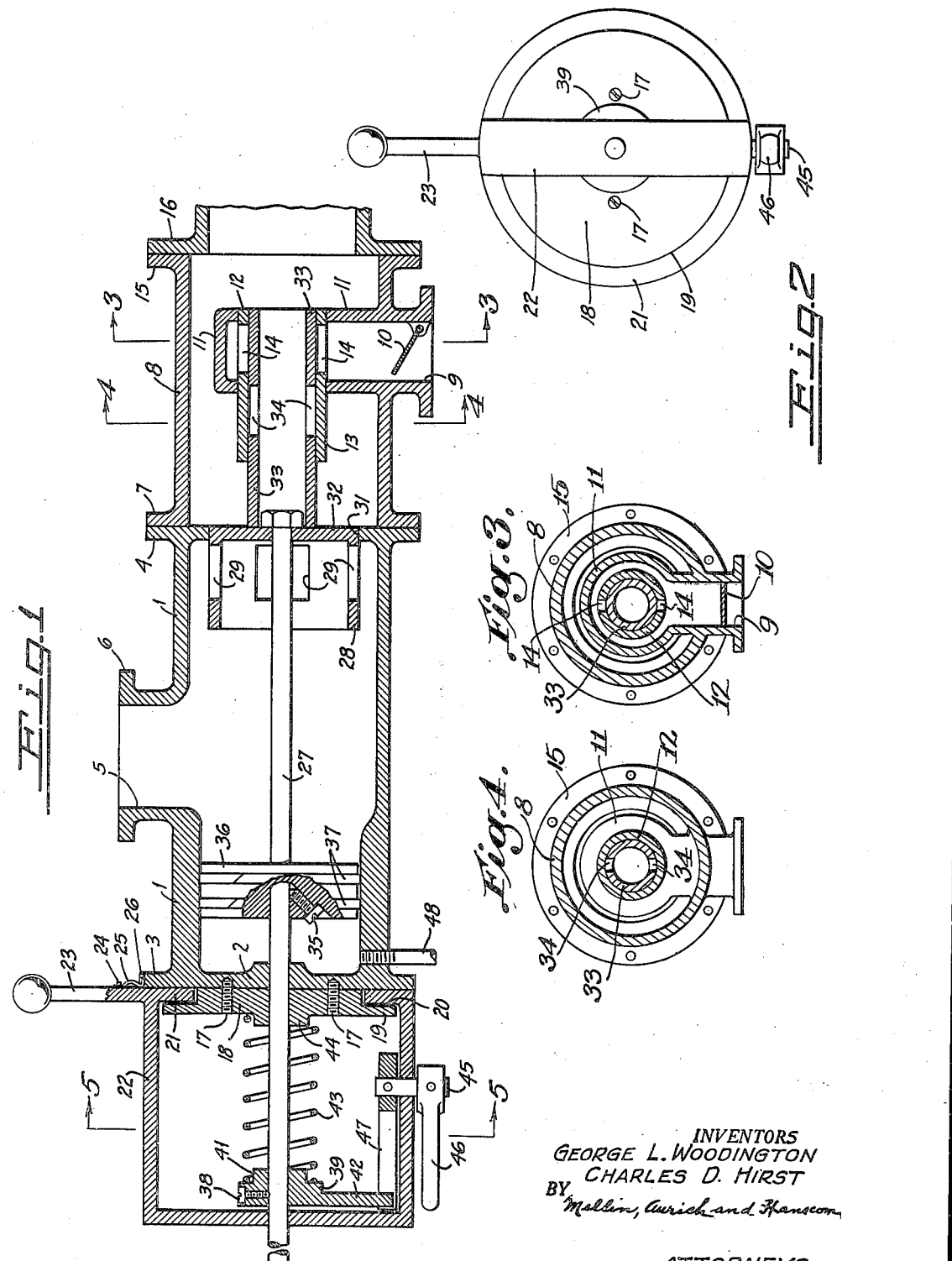

2,480,925

UNITED STATES PATENT OFFICE 2,480,925

PROPORTIONING VALVE

Charles D. Hirst, Cupertino, and George L. Woodington, North Sacramento, Calif.; said George L. Woodington assignor, by decree of distribution, to Vera J. Woodington, North Sacramento, Calif.

Application September 18, 1945, Serial No. 617,094

7 Claims. (Cl. 169—14)

This invention relates in general to a valve and has for its object the provision of a valve for proportioning dissimilar fluids in predetermined ratios and for maintaining this ratio irrespective of the flow through the device.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 1 is a vertical mid-section taken through a valve embodying the objects of our invention.

Fig. 2 is an end elevation of the valve shown in Fig. 1.

Fig. 3 is a vertical section taken on the line 3—3 of Fig. 1.

Fig. 4 is a vertical section taken on the line 4—4 of Fig. 1.

Fig. 5 is a vertical section taken on the line 5—5 of Fig. 1.

Fig. 6 is a flow diagram illustrating the manner in which the valve shown in Figs. 1 and 2 is connected with sources of dissimilar fluids and through the suction side of a pressure pump, with a bank of foam producing nozzles.

As shown in Figs. 1 and 2, the objects of our invention have been embodied in a valve comprising a central cylinder 1 closed at its left end by a wall 2 and provided at either end with flanges 3 and 4. Formed centrally of the cylinder 1 is a fluid intake port 5 provided with a flange 6 for connecting the cylinder with a suitable source of fluid.

Fastened to the flange 4 is the flange 7 of a mixing chamber 8 provided intermediate its ends with a flanged solution intake port 9. Associated with the port 9 is an inwardly opening check valve 10. Formed as an extension of the port 9 is a cylindrical conduit or chamber 11 provided with a circular opening 12 coaxial with the cylinder 1 and the mixing chamber 8. Welded or otherwise fastened within this opening is a sleeve 13, the left end of which protrudes into the left end of the mixing chamber 8. Formed in the sleeve 13 within the confines of the chamber 11 are a plurality of peripherally spaced, longitudinally extending slots 14 of predetermined width. Fastened to a flange 15 provided on the right end of the mixing chamber 8 is a pump connection 16.

Fastened to the left face of the wall 2 by screws 17 is a disc 18 provided with a flange 19. The flange 19 and the flange 3 of the cylinder 1 define an annular channel 20 for the reception of an annular ring 21 which in turn supports the legs of a generally U-shaped, longitudinally extending bracket 22. Extending outwardly or radially from the ring 21 is a lever 23 by which the ring 21 and bracket 22 may be rotated with respect to the cylinder 1. Fastened to the lever 23 by a screw 24 is a spring finger 25 arranged to engage a series of notches or serrations 26 formed on the peripheral edge of the flange 3 and by which the bracket 22 can be adjustably locked in any predetermined angular position with respect to the cylinder 1.

Extending through the base of the bracket 22, through the disc 18 and wall 2, is a piston rod 27. Secured to the right end of the rod 27 is a valve cup 28 provided with a plurality of peripherally spaced, longitudinally extending openings 29, the said cup being arranged to close a port 31 formed in the right end of the cylinder 1. Welded to the circular closure member or end wall 32 of the cup 28 is a valve sleeve 33 arranged to slide within the sleeve 13 with a relatively close clearance. The sleeve 33 is provided intermediate its ends with a plurality of peripherally spaced longitudinally extending slots 34, which in number and radial alignment correspond with the slots 14 formed in the fixed sleeve 13 and which can be made to register with these slots upon the proper radial and longitudinal positioning of the sleeve 33.

Fastened to the rod 27 within the left end of the cylinder 1 by a set screw 35 is piston 36 provided with suitable rings 37. Since the piston 36 must make a relatively tight liquid seal with the cylinder 1, the interior surface of the left end of the cylinder is machined in accordance with usual practice.

Fastened to the rod 27 within the confines of the U-shaped bracket 22 by means of a screw 38 is hub 39 formed with an inwardly extending boss 41 and with a radially extending finger or cam follower 42. Surrounding the shaft 27 within the confines of the U-shaped bracket 22 is a piston return spring 43, this spring being seated at its left end on the boss 41 and at its right end on a boss 44 extending outwardly from the disc 18.

Extending through the lower leg of the U-shaped bracket 22 and having a friction fit therewith is a pin 45 provided at its lower end with an operating handle 46. Secured to the upper end of the pin 45 is a rearwardly extending cam fork 47 arranged to receive the outer end of the cam follower 42. Although the two legs of the fork should be parallel to each other, they can be straight or arcuate, depending upon the path which it is desired that the cam follower 42 should describe in response to the longitudinal movement of the piston rod 27.

Communicating with the interior of the piston cylinder or casing 1 is a vent and drain tube 48 for draining that portion of the cylinder 1 to the left of the piston 36 and for maintaining it under atmospheric pressure.

As shown in Fig. 3, the port 5 of the proportioning valve above described is connected through a line 49 with a water supply tank 51. The port 9 communicates through a line 52 with a solution tank 53 and the open discharge end of the mixing chamber 8 communicates through the fitting 16, a line 54, a pressure pump 55 and a line 56 with a manifold 57. Connected to the manifold 57 through valves 58 are a series of foam producing nozzles 59. As so connected, our valve is used for proportioning and mixing a foam solution contained in the tank 53 with water contained in the tank 51 for extinguishing fires.

When water or other liquid is delivered through the port 5 into the cylinder 1, the device remains in a static condition in the position shown in Figure 1 unless the mixing chamber 8 is placed under the influence of the pump 55 for the area of the piston 36 is equal to the cross-sectional area of the end wall 32 of the valve cup 28. Upon placing the pump in operation, the end wall 32 will be subjected to a lowered pressure serving to move the valve cup 28, and all parts fastened thereto, to the right. This movement will place the slots 34 in partial or total registration with the slots 14 of the fixed sleeve 13 and will place the openings 29 of the valve cup 28 in registration with the port 31. Water from the tank 51 can then pass through the cylinder 1, through the port 31, and into the mixing chamber 8. Simultaneously foam solution or other liquid from the line 52 passes through the cylindrical chamber 11, through the registering or partially registering slots 14 and 34, and through the valve sleeve 33 into the right end of the mixing chamber 8, where it mixes and is discharged with the water, through the line 54 for use wherever required. When the pump is shut down the spring 43 serves to return the piston rod 27 and its associated parts to their normal inoperative position. In passing, it should be noted that a weight can be substituted for the spring 43, either by the use of suitable pulleys or by placing the proportioning valve in an upright position.

The proportion or percentage of solution mixed with the water depends upon two factors: the degree of registration between the slots 14 and 34, and the rate of flow through the valve. The degree of registration of the coacting slots 14 and 34, in turn, depends upon two factors: the longitudinal position of the movable sleeve 33 with respect to the fixed sleeve 13 and angular position of the slots 34 with respect to the slots 14. The longitudinal position of the sleeve 33 depends upon the differential pressure to which the end wall 32 is subjected by the pump. The angular position of the slots 34 can be adjusted by rotating the piston rod 27 and this can be done by adjusting the angular position of the lever 23, for the forked cam 47 moves bodily with the bracket 22 and the cam follower 42 fixed to the rod 27 moves with the forked cam 47.

We have found, however, that even with a predetermined degree of angular registration between the slots 14 and 34, the proportion of water to solution discharged by our valve will vary depending upon the rate of flow through the valve and, consequently, upon the degree of longitudinal registration between these slots. To obviate any such variation, resort is had to the forked cam 47, which can be set at any desired angle by means of the handle 46. Since the cam follower 42 moves longitudinally with the piston rod 27 and since it must also move between the parallel legs of the cam fork 47, the sleeve 33 can be made to rotate through any desired angle during its longitudinal travel. Therefore, to adjust the valve so that it will deliver a mixture of two dissimilar liquids in a predetermined ratio such as, for example, 8% of foam solution to 92% of water regardless of any variation in the rate of flow through the valve, the lever 23 is first adjusted to give the required proportion with the slots 14 and 34 in full longitudinal and angular registration and then, by the trial and error method, the angular position of the cam fork 47 is adjusted until a constant ratio in the discharge is obtained regardless of the longitudinal position of the valve sleeve 34.

It will therefore be seen that we have provided a simple and relatively inexpensive valve which can be adjusted to proportion two dissimilar liquids in any predetermined ratio and which will maintain such ratio irrespective of the rate of flow through the device.

We claim:

1. A fluid proportioning device comprising: a mixing chamber provided with a discharge port and a circular intake valve port; a stationary valve sleeve secured to and within said mixing chamber coaxial with said discharge port and provided with a longitudinally extending peripheral slot; an intake conduit extending into and sealed to said chamber and to said stationary sleeve about the slot therein; a slidable valve sleeve telescopically disposed within said stationary sleeve, said slidable valve sleeve being provided with a longitudinally extending peripheral slot arranged to be placed in registration with the slot in said stationary sleeve; a valve closure member connected to said slidable valve sleeve and suported by said stationary valve sleeve, said valve closure member being arranged to open and close said intake valve port; and means for adjusting the angular position of said stationary and slidable sleeves with respect to each other in order to adjust the degree of angular registration of the slots therein.

2. A fluid proportioning device comprising: a cylindrical mixing chamber provided at one end with a discharge port and on one side with an intake valve port; a stationary valve sleeve secured to and within said mixing chamber coaxial with said intake port and provided with a longitudinally extending peripheral slot; an intake conduit extending into and sealed to said chamber and to said stationary sleeve about the slot therein; a slidable valve sleeve telescopically disposed within said stationary sleeve, said slidable valve sleeve being provided with a longitudinally extending peripheral slot arranged to be placed in registration with the slot in said stationary sleeve; a valve closure member connected to said slidable valve sleeve and supported by said stationary valve sleeve, said valve closure member being arranged to open and close said intake valve port; and means responsive to the longitudinal movement of said slidable sleeve for varying the angular position of said slidable sleeve with respect to said stationary sleeve.

3. A fluid proportioning device comprising: a cylindrical mixing chamber provided with a discharge port and an intake valve port both of said ports being coaxial with said chamber; a stationary valve sleeve secured within said mixing chamber coaxial with said intake port and provided with a longitudinally extending peripheral slot; an intake conduit extending into and sealed to said chamber and to said stationary sleeve about the slot therein; a slidable valve sleeve telescopically disposed within said stationary sleeve, said slidable valve sleeve being provided with a longitudinally extending peripheral slot arranged to be placed in registration with the slot in said stationary sleeve; a valve closure member connected to said slidable valve sleeve and supported by said stationary valve sleeve, said valve closure member being arranged to open and close said intake valve port; resilient means for opposing any longitudinal movement of said valve closure member inwardly into said mixing chamber; and means for adjusting the angular position of said stationary and slidable valve sleeves with respect to each other in order to adjust the degree of angular registration of the slots therein.

4. A fluid proportioning device comprising: a cylindrical mixing chamber provided with a discharge port and a circular intake valve port said ports being coaxial with said chamber; a stationary sleeve secured to and within said mixing chamber coaxial with said intake port and provided with a plurality of longitudinally extending, peripherally spaced slots; an intake conduit extending into said chamber and sealed to said chamber and to said stationary sleeve about its said slots; a slidable valve sleeve telescopically disposed within said stationary sleeve, said slidable sleeve being provided with a plurality of slots complementary to the slots in said stationary sleeve and arranged to be placed in registration therewith; a valve closure member connected to said slidable valve sleeve and supported by said stationary sleeve, said valve closure member being arranged to open and close said intake valve port; and means responsive to the longitudinal movement of said slidable sleeve for varying its angular position with respect to said stationary sleeve.

5. A fluid proportioning device comprising: a cylindrical mixing chamber provided with a discharge port and an intake valve port, said ports being coaxial with said chamber; a stationary sleeve secured within and to said mixing chamber coaxial with said intake port and provided with a longitudinally extending peripheral slot; an intake conduit extending into and sealed to said chamber and to said stationary sleeve about the slot therein; a slidable valve sleeve telescopically disposed within said stationary sleeve, said slidable valve sleeve being provided with a longitudinally extending peripheral slot arranged to be placed in registration with the slot in said stationary sleeve; a valve closure member connected to said slidable valve sleeve and supported by said stationary sleeve, said valve closure member being arranged to open and close said intake valve port; and means including an angularly adjustable cam track and a cam track follower for varying the degree of angular registration of the slots in said stationary and slidable sleeves in response to the longitudinal movement of said slidable sleeve.

6. A fluid proportioning device comprising: a fluid receiving cylinder closed at one end and provided at its other end with a circular valve port, said cylinder being provided intermediate its ends with a lateral intake port; a piston rod disposed within said cylinder and extending through a bearing associated with its closed end; a piston secured to said rod adjacent the closed end of said cylinder; an open-ended mixing chamber secured to said cylinder over its circular valve port; a stationary valve sleeve secured to and within said mixing chamber coaxial with said circular valve port and provided with a longitudinally extending, peripheral valve slot; a lateral intake conduit extending into said mixing chamber and sealed to said chamber and to said stationary valve sleeve about the valve slot therein; a slidable valve sleeve telescopically disposed within said stationary sleeve, said slidable valve sleeve being provided with a longitudinally extending, peripheral slot arranged to be placed in registration with the slot in said stationary sleeve; a valve closure member fastened to said piston rod and to said slidable valve sleeve and arranged to open and close said circular valve port; and means for adjusting the angular position of said stationary and slidable valve sleeves with respect to each other in order to adjust the degree of angular registration of the slots therein.

7. A fluid proportioning device comprising: a fluid receiving cylinder closed at one end and provided at its other end with a circular valve port, said cylinder being provided intermediate its ends with a lateral intake port; a piston rod disposed within said cylinder and extending through a bearing associated with its closed end; a piston secured to said rod adjacent the closed end of said cylinder; an open-ended mixing chamber secured to said cylinder over its circular valve port; a stationary valve sleeve secured to and within said mixing chamber coaxial with said circular valve port and provided with a longitudinally extending, peripheral valve slot; an intake conduit extending into said mixing chamber and sealed to said chamber and to said stationary valve sleeve about the valve slot therein; a slidable valve sleeve telescopically disposed within said stationary sleeve, said slidable valve sleeve being provided with a longitudinally extending, peripheral slot arranged to be placed in registration with the slot in said stationary sleeve; a valve closure member fastened to said piston rod and to said slidable valve sleeve and arranged to open and close said circular valve port; means for adjusting the angular position of said stationary and slidable valve sleeves with respect to each other in order to adjust the degree of angular registration of the slots therein, said means including an angularly adjustable cam track carried by said fluid receiving cylinder and a cam follower fixed to said shaft and operatively associated with said cam track; and means asssociated with said piston rod for biasing said valve closure member to its closed position.

CHARLES D. HIRST.
GEORGE L. WOODINGTON.

No references cited.